July 20, 1965   R. E. BELLIVEAU ETAL   3,195,225
METHOD OF MANUFACTURING RESISTANCE ELEMENTS
Filed Dec. 11, 1961
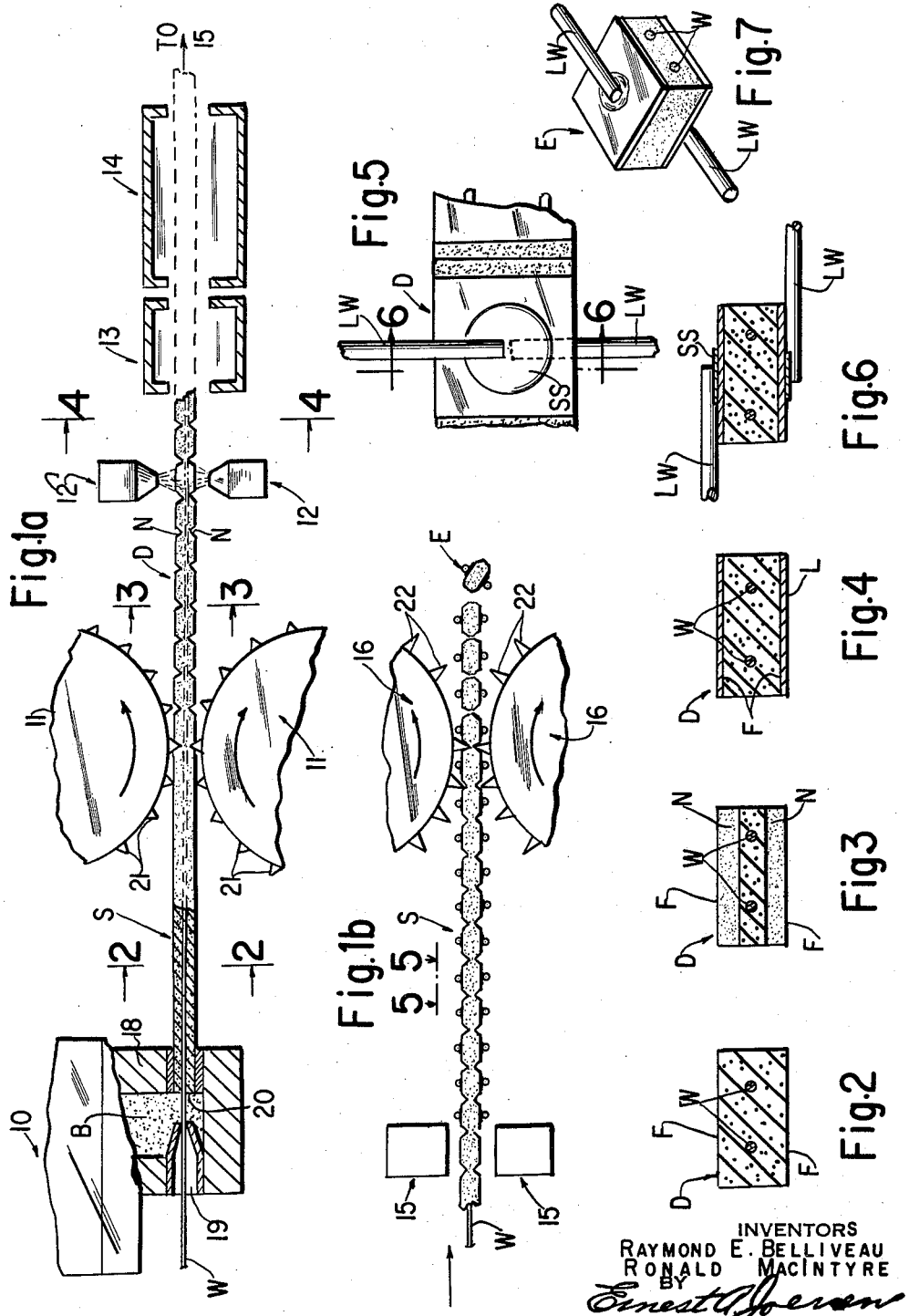
INVENTORS
RAYMOND E. BELLIVEAU
RONALD MACINTYRE
BY
*Ernest ...*
ATTORNEY United States Patent Office 3,195,225
Patented July 20, 1965

3,195,225
METHOD OF MANUFACTURING RESISTANCE ELEMENTS
Raymond E. Belliveau, West Paterson, and Ronald MacIntyre, North Arlington, N.J., assignors to Specialties Development Corporation, Belleville, N.J., a corporation of New Jersey
Filed Dec. 11, 1961, Ser. No. 158,257
4 Claims. (Cl. 29—155.62)

The present invention relates to a method of manufacturing resistance elements, and, more particularly, to a continuous method of manufacturing resistance elements such as thermistors, varistors, resistors and the like.

Resistance elements of the foregoing type usually are relatively small in size, and comprise a body composed of a ceramic-like mixture containing one or more metallic oxides for establishing the resistance characteristic of the element and two or more lead or terminal wires secured to the body. The bodies generally are formed from the ceramic-like mixture while the mixture is in a semi-plastic or moldable state and are then air dried and fired to remove the moisture content thereof and cause the same to harden.

Heretofore, two procedures have been utilized for securing the lead wires, namely (1) by forming the bodies and then securing the lead wires to the external surface thereof or (2) by extruding the bodies onto one or more wires which, upon firing, are embedded in the bodies and which have outwardly extending portions provided by removing one or more bodies and adapted to serve as lead wires.

A disadvantage of the first procedure was that the individual bodies by reason of their small size were difficult to handle while soldering or similarly applying the lead wires thereon whereby the lead wires were applied non-uniformly. This resulted in a large number of rejected elements which increased manufacturing costs.

The second procedure overcomes the disadvantages of the first procedure and produces uniformly constructed elements but the firing of the body while having the lead wires embedded therein affects the surface conductivity of the wires in some instances.

Accordingly, an object of the present invention is to provide an improved method of manufacturing resistance elements of the type indicated herein which method has the advantages of both of the two prior procedures but does not have the disadvantages thereof. Another object is to provide such a method which is continuous at least in the sense that can be performed on a production line but also can be truly continuous in the sense that the steps of the method are performed successively in sequence without interruption.

A further object is to provide such a method which can be performed in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been conceived that the foregoing objects generally can be accomplished by utilizing a method which generally comprises extruding on wire a continuous length of resistance material in the form of a strip provided with substantially flat surfaces at opposite sides and having the wire extending lengthwise therethrough, subdividing the strip into closely adjacent discs carried on the wire, firing the discs to cause the same to harden and be adhered to the wire, securing an electrical lead to each of the flat surfaces, and severing the wire between adjacent discs to produce individual resistance elements.

A preferred embodiment of the invention has been chosen for purposes of illustration and description, and is shown in the accompanying drawing, forming a part of the specification, wherein:

FIG. 1a and FIG. 1b taken together schematically illustrate the essential steps of the method in accordance with the present invention.

FIG. 2 is an enlarged sectional view taken along the line 2—2 on FIG. 1a and illustrating the extruded strip.

FIG. 3 is an enlarged sectional view taken along the line 3—3 on FIG. 1a and illustrating the strip after subdivision thereof to provide discs.

FIG. 4 is an enlarged sectional view taken along the line 4—4 on FIG. 1a and illustrating a metallic coating applied to opposite surfaces of the discs.

FIG. 5 is an enlarged fragmentary plan view taken along the line 5—5 on FIG. 1b and illustrating a disc after firing and securement of the electrical leads thereto.

FIG. 6 is a sectional view taken along the line 6—6 on FIG. 5.

FIG. 7 is an enlarged perspective view of an individual element after the wire severing step has been performed.

Referring now to FIG. 1a and FIG. 1b of the drawing in detail, there is shown apparatus for performing the steps of the continuous method herein which apparatus comprises an extruder 10 for forming a strip S on wire W, notching wheels 11 for subdividing the strip into discs D, opposed nozzles 12 for applying a layer of electrically conductive metal L at opposite sides of the discs, an oven 13 for drying the discs, a furnace 14 for firing the discs, apparatus 15 for applying a spot of solder SS and securing lead wires LW to the discs, and cutting wheels 16 for severing the wire W between adjacent discs to produce individual resistance elements.

The extruder 10 includes a hopper 18 for the body material B, a guide 19 for feeding two wires W into the hopper and an orifice 20 for extruding the body material onto the wires W to produce a continuous strip S having a rectangular cross-section or having at least two opposite substantially flat sides F (FIG. 2) with the wires W embedded therein and extending therethrough in a lengthwise direction.

The notching wheels 11 include upper and lower wheels between which the strip passes. Each wheel has uniformly circumferentially spaced transverse teeth 21 on the periphery thereof for forming opposed notches N in the strip which extend to or almost to the wires W and thereby determine the length of the subdivided discs D (FIG. 3).

The nozzles 12 preferably are employed to spray fluid electrically conducting metallic material onto the flat surfaces F while the discs move therebetween to provide the layer L of metal (FIG. 4) for establishing a reliable conductive path between the body of the element and its lead wires.

The oven 13 may be heated by infrared lamps (not shown) to dry the coating L as the discs supported on the wires W move therethrough.

The furnace 14 fires the discs at a temperature to first remove the moisture content thereof and to then fuse body material to cause the same to harden and adhere firmly to the wires W. This firing step also causes shrinkage of the discs whereby, if the adjacent discs are partially connected to each other at the base of opposed notches N, the discs are structurally separated from each other except for the supporting wires W to facilitate severing the wires later on. If desired, the furnace 14 can also be utilized for firing the discs at a predetermined temperature and an interval of time to adjust the resistance of the body material to a desired value.

Suitable automatic apparatus 15 is employed for tinning the coated surface in preparation for soldering, placing a spot of solder SS on each surface F and applying the lead wires LW (FIG. 5 and 6) to effect securement thereof. The lead wires extend crosswise on the surfaces F in opposite directions as shown or in the same direction if desired and are disposed in a plane extending perpendicularly through the discs.

The cutting wheels 16 include upper and lower wheels between which the discs D on the wires W pass. Each wheel has cutting blades 22 thereon which are circumferentially arranged and indexed to enter opposed notches or the space between adjacent discs to sever the wires W whereby the individual elements E (FIG. 7) for the first time are separated from each other at the completion of the method by which they are produced.

In a specific embodiment of the present invention for producing elements E, the body material B may be any of the many available extrudable ceramic-like compositions having resistance characteristics. For example, such a composition comprises approximately:

| | Percent by weight |
|---|---|
| Resistance material | 50 |
| Frit | 15 |
| Steatite | 50 |
| Flour | 5 |

The resistance material comprises one or more metallic oxides, for example 90% manganese dioxide and 10% cupric oxide.

The frit may be prepared by melting, solidifying and grinding a mixture comprising approximately:

| | Percent by weight |
|---|---|
| Feldspar | 32 |
| Flint | 11 |
| Borax | 38 |
| Soda ash | 6 |
| Sodium nitrate | 4 |
| Fluospar | 9 |

Sufficient water is added to the composition to make the mass B suitable for extrusion onto wire.

The strip S may have a width of 0.25 inch and a thickness of 0.125 inch, and a discs D formed from the strip may have a length of 0.25 inch.

Two wires W have the strip S extruded thereon to provide a good support for the strip and the discs D to facilitate handling thereof during the fabrication of the elements E, although only one wire W or more than two wires W may be used if desired. Since these wires are not used for providing an electrical connection and have no function in the element E except to reinforce the same, the composition of the wire is not important and the cheapest wire available which can withstand the firing temperature may be used. When two or more wires are used, they are spaced apart a sufficient distance to eliminate the possibility of short circuiting effects within the elements.

The metallic coating L may be provided by spraying an electrically conductive platinum paint thereon which is dried as the discs pass through the oven 13.

The lead wires LW may be tinned copper wires having a diameter of between about 0.016 inch and about 0.040 inch depending upon the ultimate use of the elements.

If desired, a protective coating is applied to the individual elements E in any known manner.

In utilizing the method in accordance with the present invention, thousands of elements can be produced per hour. The elements have high uniformity as to resistance values, and less than 12% of the elements are unacceptable because of all possible reasons for rejecting the same.

From the foregoing description, it will be seen that the present invention provides a simple, practical and economical method of manufacturing identical resistance elements at a high rate.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. The method of making a multiplicity of identical electrical resistance elements, which method comprises the sequence of steps of continuously moving a continuous length of wire in a lengthwise direction through a plurality of zones in a production line, extruding onto the wire a continuous mass of resistance material in the form of a strip provided with substantially flat parallel opposite sides with the wire extending lengthwise therethrough, transversely notching the strip at opposite sides in a common plane to subdivide the strip into partially connected masses of identical shape and size, firing the masses to cause the same to harden and be adhered to the wire, securing a transversely extending electro-conductive lead to both sides of each mass, and finally separating the adjacent masses at the notches and severing the wire at the notches to produce the individual resistance elements.

2. The method according to claim 1, wherein the masses are separated and the wire is severed substantially simultaneously.

3. The method according to claim 1, which includes the step of applying an electro-conductive coating on both sides of the masses before firing the masses.

4. The method according to claim 3, wherein the leads are secured to the masses by soldering the same to the electro-conductive coating.

References Cited by the Examiner

UNITED STATES PATENTS

| 2,495,867 | 1/50 | Peters | 338—26 |
| 2,566,335 | 9/51 | Joerren | 335—26 |
| 2,937,354 | 5/60 | Mazzarella et al. | 338—22 |
| 3,024,435 | 3/62 | Rollins et al. | 338—22 |

JOHN F. CAMPBELL, *Primary Examiner.*

ARTHUR M. HORTON, *Examiner.*